United States Patent
Nguyen et al.

(10) Patent No.: US 6,393,156 B1
(45) Date of Patent: May 21, 2002

(54) ENHANCED TRANSFORM COMPATIBILITY FOR STANDARDIZED DATA COMPRESSION

(76) Inventors: Truong Q. Nguyen, 7479 Collins Ranch Ter., San Diego, CA (US) 92130; Joel A. Rosiene, 66 Harbor Rd., Colchester, CT (US) 06415

(*) Notice: Subject to any disclaimer, the term of this patent is extended or adjusted under 35 U.S.C. 154(b) by 0 days.

(21) Appl. No.: 09/226,586

(22) Filed: Jan. 6, 1999

Related U.S. Application Data

(60) Provisional application No. 60/070,689, filed on Jan. 7, 1998.

(51) Int. Cl.[7] .................................................. G06K 9/36
(52) U.S. Cl. ................... 382/248; 382/250; 375/240.26; 358/432
(58) Field of Search ................................. 382/248, 249, 382/250; 358/432, 433; 375/240.26

(56) References Cited

U.S. PATENT DOCUMENTS

| | | | |
|---|---|---|---|
| 5,859,788 A | * | 1/1999 | Hou ........................... 708/400 |
| 6,101,279 A | * | 8/2000 | Nguyen et al. ............. 382/240 |
| 6,160,919 A | * | 12/2000 | Hale ........................... 382/250 |

OTHER PUBLICATIONS

Ricardo L. de Queiroz et al., *The GenLOT: Generalized Linear–Phase Lapped Orthogonal Transform*, IEEE Transactions on Signal Processing, vol. 44, No. 3, Mar. 1996, pp. 497–507.

* cited by examiner

*Primary Examiner*—Bhavesh Mehta
*Assistant Examiner*—Ali Bayat
(74) *Attorney, Agent, or Firm*—Mills & Onello LLP

(57) ABSTRACT

In an apparatus and method for image/video enhancement, pre-processing and post-processing techniques are employed to effectively modify the transforms used in a fixed, standardized data compression coder. In this manner, alternative transforms, for example overlapping-basis-type transforms, are made to be applicable to, and compatible with, various data compression standards, thereby improving system performance.

36 Claims, 6 Drawing Sheets

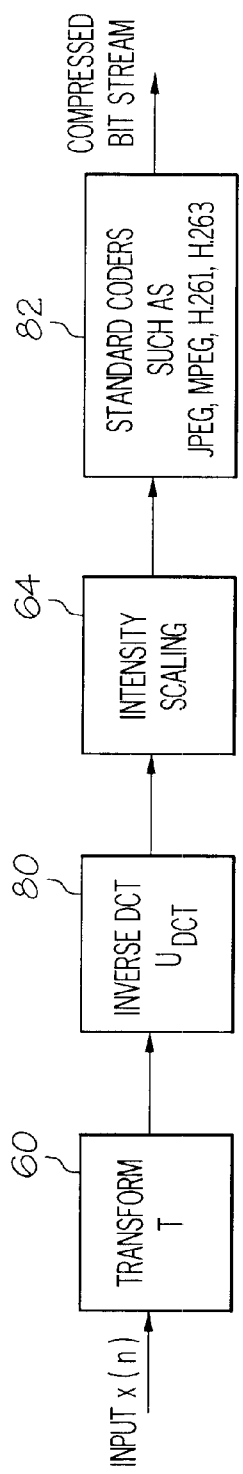
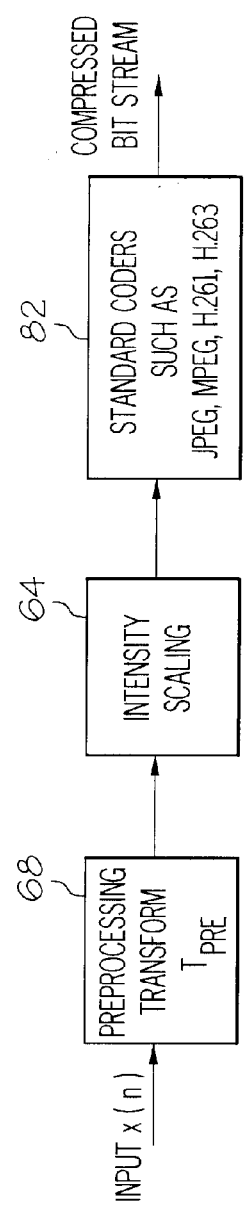

ENHANCED TRANSFORM COMPATIBILITY FOR STANDARDIZED DATA COMPRESSION

RELATED APPLICATIONS

This application claims the benefit of U.S. Provisional Application No. 60/070,689, filed Jan. 7, 1998, the contents of which are incorporated herein by reference.

BACKGROUND OF THE INVENTION

1. Field of the Invention

The present invention relates generally to methods and apparatus for improving image quality in image and video compression systems. More particularly, the present invention relates to a technique that employs pre- and post-processing to allow alternative transforms (such as Wavelet Transform (WLT), Wavelet Packet Transform (WPT), Lapped Orthogonal Transform (LOT), Generalized Lapped Orthogonal Transform (GenLOT), and Generalized Lapped Biorthogonal Transform (GLBT)) to be used with standard-compliant video compression coders (for example JPEG/MPEG/H.26x standards).

2. Background of the Related Art

The trend of visual communication has evolved rapidly in recent years as a result of advances in hardware technology, as well as the proliferation of multimedia-based software applications, such as Internet browsers. Standards for transmitting and storing visual information also encourage rapid deployment of interchangeable multimedia consumer products.

Contemporary high-quality image/video compression techniques commonly employ some form of forward and inverse transforms. Widely-used image and video compression standards include the JPEG, MPEG, H.261, and H.263 compression techniques, which are based on the Discrete Cosine Transform (DCT). The well-known JPEG image encoding technique, developed by the Joint Photographic Expert Group, is widely used in image compression software and hardware. As illustrated in the block diagram of FIG. 1, the image is divided into a number of 8×8 blocks of data elements 40, each of which is then transformed at a transform process 42 using a 2-dimensional DCT. The transform coefficients are next arranged into 64 sub-bands at spectrum estimator 44, are scalar-quantized at quantizer 46, adaptively baseline-coded and Huffman-coded at coder 48, and stored in memory 50.

The well-known MPEG video encoding technique, developed by the Motion Pictures Expert Group, achieves a high compression ratio, and a corresponding significant bit rate reduction, by taking advantage of the correlation between adjacent pixels in the spatial domain (using the DCT), and the correlation between image frames in the time domain (using motion estimation and prediction).

The JPEG technique yields good results for compression ratios of 10:1 and below (assuming 8-bit gray-scale images); however, at higher compression ratios, the underlying block nature of the transform begins to manifest itself in the compressed image. As compression ratios approach 24:1, only the DC (lowest frequency) coefficient has data bits allocated to it, and, at this ratio, the input image has been approximated by a set of 8×8 blocks. The reconstructed image therefore will exhibit blocking artifacts.

Several transforms with overlapping basis have been proposed for addressing the blocking artifacts. Among them are the Lapped Orthogonal Transform (LOT), *Signal Processing with Lapped Transforms,* H. S. Malvar, Norwood, Mass.: Artech House, 1992; the Generalized Lapped Orthogonal Transform (GenLOT), *The GenLOT: Generalized Linear-Phase Lapped Orthogonal Transform,* R. L. de Queiroz, T. Q. Nguyen and K. R. Rao, IEEE Transaction on Signal Processing, V44, N3, pp. 497–507, March 1996; the Wavelet Transform (WLT), *Wavelets and Filter Banks,* G. Strang and T. Nguyen, Wellesley-Cambrige Press, 1996; and the Generalized Lapped Biorthogonal Transform (GLBT), *The Generalized Lapped Biorthogonal Transform,* T. Tran, R. deQueiroz and T. Nguyen, Proceeding of the IEEE International Conference in Acoustics, Speech and Signal Processing, April 1998.

These overlapping-basis transforms reduce blocking artifacts by borrowing pixels from adjacent blocks to produce the transform coefficients of the current block. FIG. 2 depicts the aforementioned process for the case of the 8-channel LOT where the basis functions of the forward and inverse transforms have a length of 16.

Referring to FIG. 2, the transformed sequences $X_{DCT}(k)$ 54A and $X_{LOT}(k)$ 54B, both of length M, are computed as:

$$X_{DCT}(k)=T_{DCT} \cdot x_{DCT}(n), \text{DCT Processing} \quad (1a)$$

$$X_{LOT}(k)=T_{LOT} \cdot x_{LOT}(n), \text{LOT Processing} \quad (1b)$$

where $T_{DCT}$ and $T_{LOT}$ represent matrices consisting of M-basis functions for the DCT and LOT forward transforms 53 respectively. The sizes of the $T_{DCT}$ and $T_{LOT}$ matrices are M by M and M by 2M, respectively. The vectors $x_{DCT}(n)$ 52A and $x_{LOT}(n)$ 5B, of sizes M and 2M respectively, contain appropriate samples from the input image. The reconstructed sequence $\hat{x}_{DCT}(n)$ 56A and $\hat{x}_{LOT}(n)$ 56B can be defined similarly by applying the inverse transform 55 to the transformed sequences 54A, 54B. Note that the above description can be extended to two-dimensional sequences (as images), to three-dimensional sequences (as group of images or video) and to multidimensional images. The sizes of the transform can also be arbitrary (not necessarily 2M as in the LOT processing case), as in GenLOT, GLBT and wavelet processing.

With application of the overlapping basis function transform, blocking artifacts are substantially reduced or eliminated. However, these overlapping transforms are not standard compliant and therefore are not compatible for use with compression standards such as JPEG, MPEG, H.261, H.263, etc., since the standards are fixed, and do not allow for a change of basis function. Furthermore, the transform operations are commonly embedded in the coder hardware or software in a manner that does not allow for user access. Once widely deployed in the form of an application specific integrated circuit (ASIC) or software, alteration of the transform is nearly impossible.

SUMMARY OF THE INVENTION

The present invention is directed to an apparatus and method for image/video enhancement. More particularly, the present apparatus and method employ pre-processing and post-processing techniques to effectively modify the transforms used in a fixed, standardized coder. In this manner, alternative transforms, for example overlapping-basis-type transforms, are made to be applicable to, and compatible with, various data compression standards, thereby improving system performance.

In a first embodiment, the present invention is directed to an apparatus and method for pre-processing input data in a data compression system employing a fixed transform. The input data is modified by a cancellation transform which is the substantial inverse of the fixed transform to generate pre-processed data. The pre-processed data are applied to the fixed transform to generate compressed data, the compressed data being substantially unaffected by the fixed transform.

In a preferred embodiment, the present invention further comprises modifying the input data by an alternative transform, for example a Lapped Orthogonal Transform, a Generalized Lapped Orthogonal Transform, a Wavelet Transform, a Wavelet-Packed Transform, or other artifact-reduction transform. The compressed data may be decompressed by applying a decompression transform which is the substantial inverse of the fixed transform. The decompressed data may be further applied to the fixed transform, to generate transformed decompressed data which is substantially unaffected by the fixed transform. The fixed transform may comprise a Discrete Cosine-Based Transform (DCT). The transformed decompressed data may be applied to an inverse of the alternative transform to generate output data.

The input and output data may comprise a variety of signals, for example image data, video data, audio data, and multidimensional data. For multidimensional data, the pre- and post-processing techniques are preferably applied across some or all rows and columns, and across some or all dimensions. The fixed transform may be applied to a standard compression system, for example JPEG, MPEG-I, MPEG-II, H.261, H.263, H.263+, and H.324. The pre- and post-processing techniques of the present invention may be applied to all images of a video or audio sequence, or a subset thereof. The data are preferably intensity-scaled to match system dynamic range.

In this manner, alternative transforms, for example image-enhancing transforms may be employed in systems utilizing standardized data compression techniques.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a block diagram of the processing steps for application of an alternative transform T to a pre-processing technique for a standard-compliant DCT-based coder having a forward transform $T_{DCT}$ and an inverse transform $U_{DCT}$ in accordance with the present invention.

DETAILED DESCRIPTION OF PREFERRED EMBODIMENTS

Given a coder C which employs a forward transform $T_{coder}$ for data compression, and an inverse transform $U_{coder}$ for data decompression, a pre-processing transform $T_{pre}$ and a post-processing transform $U_{post}$ can be generated:

$$T_{pre} = U_{coder} \cdot T, \text{ Pre-processing} \quad (2a)$$

$$U_{post} = U \cdot T_{coder}, \text{ Post-processing} \quad (2b)$$

such that a new, alternative forward transform T, of size M by N, and its corresponding inverse transform U, of size N by M, can be compatibly employed with the coder C. Assume the dimensions of $T_{coder}$ and $U_{coder}$ to be M by L and L by M, respectively. Accordingly, the pre-processing and post-processing transforms $T_{pre}$ and $U_{post}$ have dimensions L by N and N by L, respectively, where L, M, and N are integers.

Figure 1:
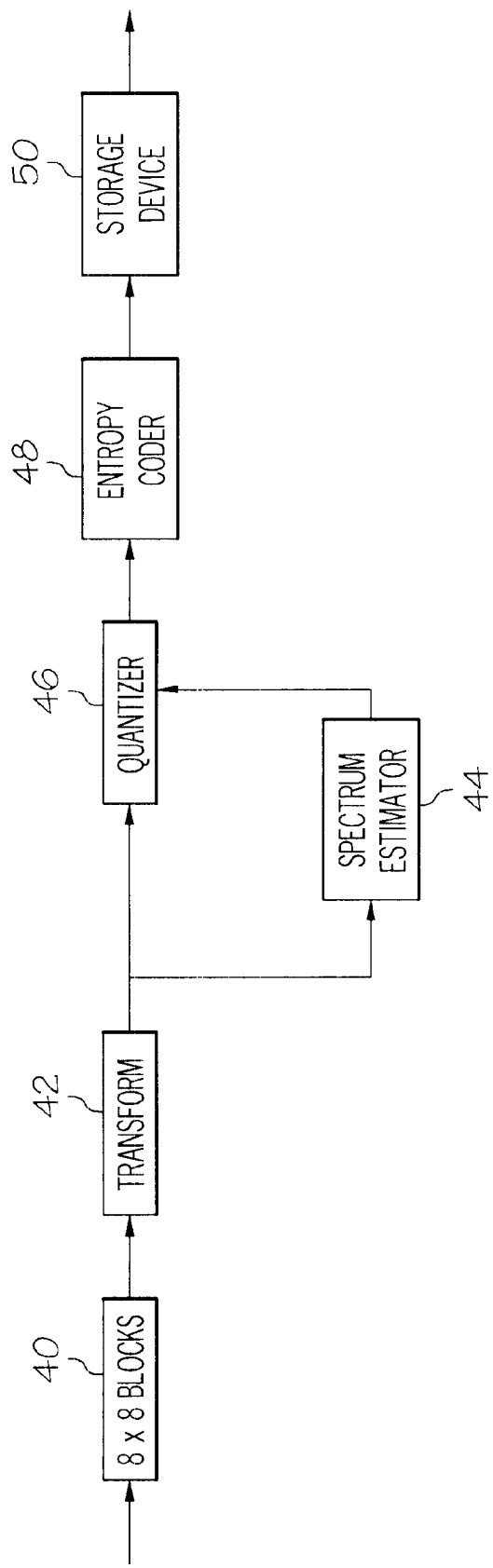
FIG. 1 is a block diagram of a conventional image transform-based coder.
Figure 2:
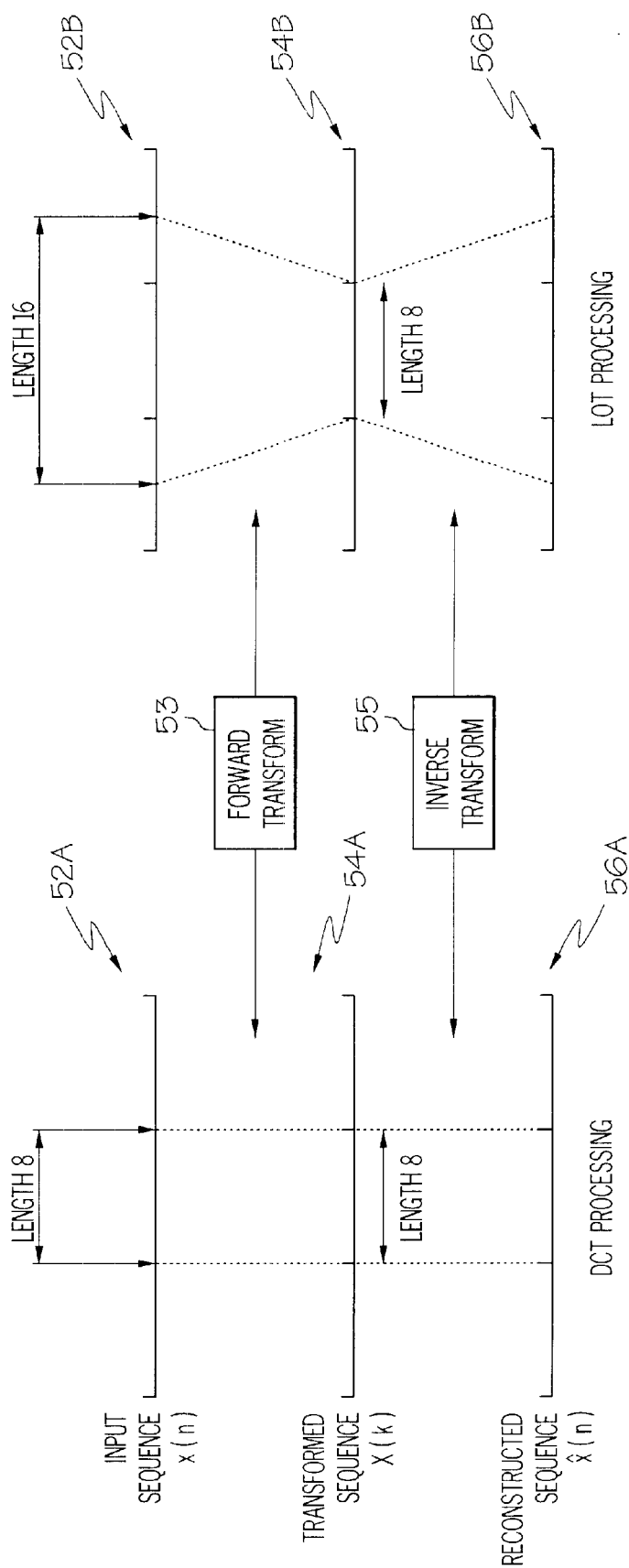
FIG. 2 illustrates Discrete Cosine Transform (DCT) processing and Lapped Orthogonal Transform (LOT) processing on a one-dimensional sequence in the conventional image transform-based coder of FIG. 1.
Figure 3A:
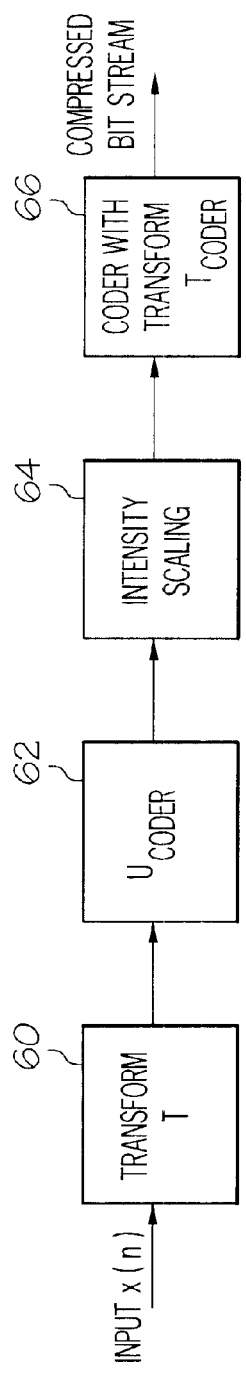
FIG. 3 is a block diagram illustrating the processing steps for application of an alternative transform T to a pre-processing technique employing a coder having a forward transform $T_{coder}$ and an inverse transform $U_{coder}$, in accordance with the present invention.
Figure 3B:
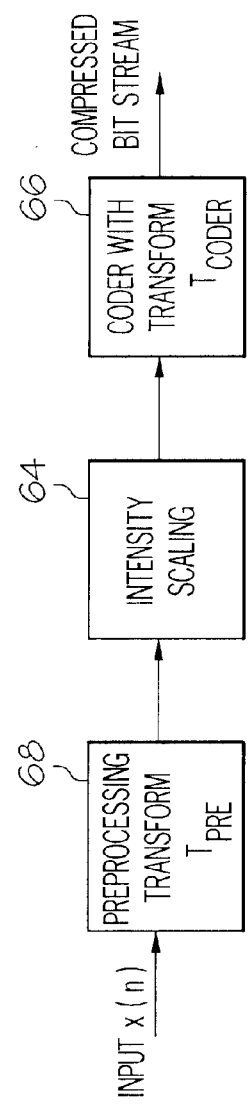

FIG. 3A is a block diagram of a pre-processing technique in accordance with the present invention. Input data x(n) are applied to an alternative forward transform T 60 which may comprise an overlapping-basis transform as described above. The transformed data is next applied to an inverse of the fixed transform $U_{coder}$ 62, which, as explained above, is the inverse of the fixed transform $T_{coder}$ performed in coder C. The combination of the alternative forward transform T 60 and the inverse of the fixed transform $U_{coder}$ 62 is referred to herein as the pre-processing transform $T_{pre}$ 68 as shown in FIG. 3B, and expressed above in Equation 2a. In this manner, the input data x(n) are processed by a pre-processing transform $T_{pre}$ 68 to compress the data according to the newly-introduced transform T 60, and further to cancel the effects of the fixed transformed $T_{coder}$ included with the data compression encoder.

The pre-processed data is applied to an intensity scaling process 64 in order to scale the dynamic range of the data to match that of the coder 66. The scaled data is then compressed at coder 66 employing the fixed transform $T_{coder}$ in accordance with standard data compression techniques.

Figure 4A:
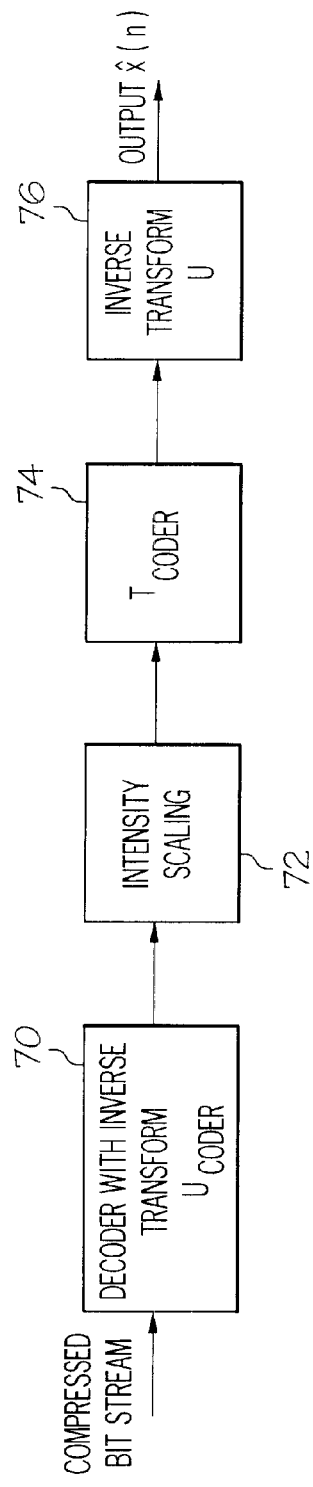
FIG. 4 is a block diagram of the processing steps employed for application of an alternative inverse transform U to a post processing technique employing a coder having a forward transform $T_{coder}$ and an inverse transform $U_{coder}$ in accordance with the present invention.
Figure 4B:
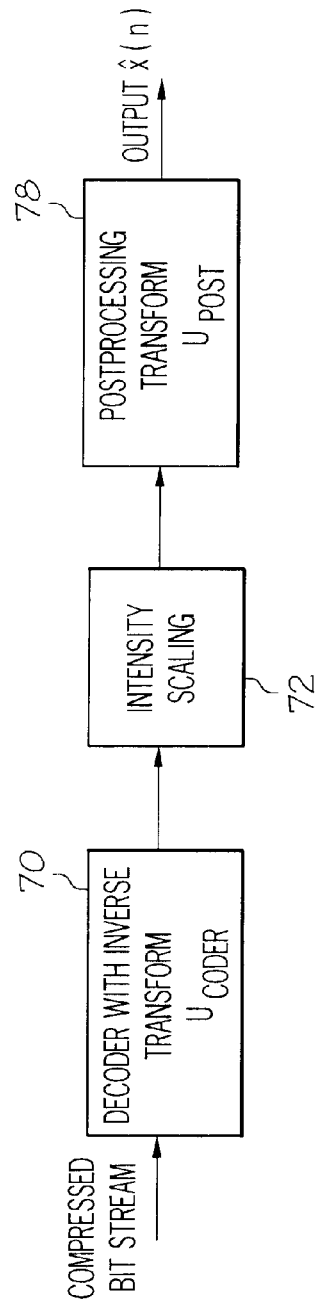
Figure 6A:
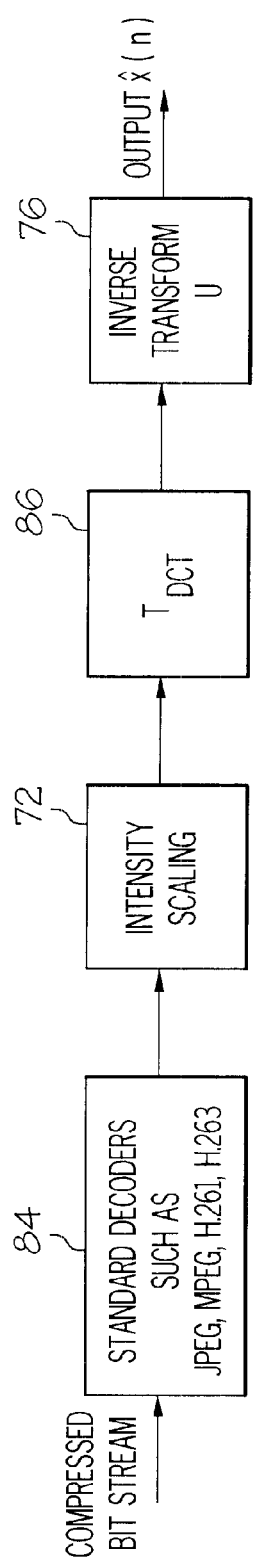
FIG. 6 is a block diagram of the processing steps for application of an alternative inverse transform U to a post-processing technique for a standard-compliant DCT-based coder having a forward transform $T_{DCT}$ and an inverse transform $U_{DCT}$.
Figure 6B:
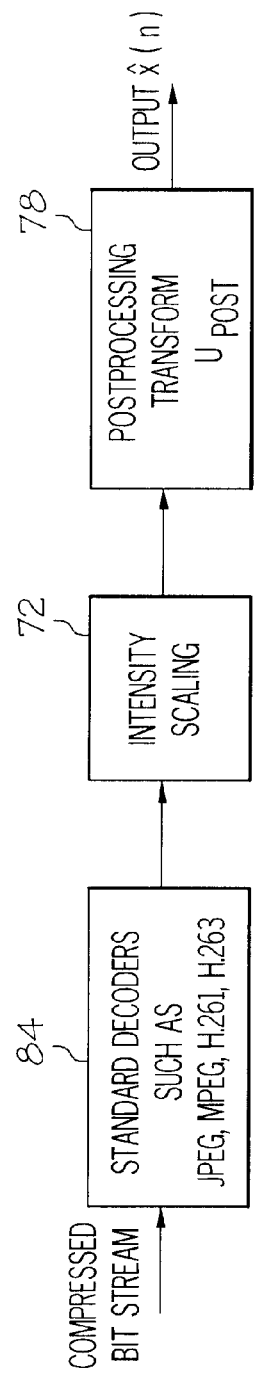

As shown in FIGS. 4A and 4B, the compressed data are received and decompressed at a decoder 70 which employs a fixed inverse transform $U_{coder}$, which is the inverse transform of the fixed transform $T_{coder}$. The decoded data are intensity-scaled at a scaling process 72, and the scaled data are applied to a forward transform $T_{coder}$ 74 which operates to substantially cancel the effects of the inverse transform $U_{coder}$. The transformed data are next applied to an inverse transform U 76 which is the inverse of alternative forward transform T 60 of FIG. 3A, thereby generating output data x̂(n). The combination of the forward transform $T_{coder}$ and inverse transform U are represented in FIG. 4B, and expressed above in equation (2b), as post-processing transform $U_{post}$ 78.

In this manner, data are compressed and decompressed according to an enhanced alternative transform T and alternative inverse transform U in a manner consistent with an otherwise non-compatible standard data compression coder C having fixed forward and inverse data transforms, without modifying the structure and operation of the coder C.

In alternative embodiments, the pre-processing transform $T_{pre}$ 68 may be precalculated as a single matrix and therefore operate on the input data in a single step, or may be applied as individual serial processes 60, 62. The same applies to the post-processing transform $U_{post}$.

In one embodiment, as shown in FIGS. 5A, 5B, 6A and 6B, the present invention employs a standard-compliant image/video data compression coder 82 and decoder 84 (JPEG/MPEG/H.26X) which utilizes a fixed Discrete Cosine Transform matrix $T_{coder}=T_{DCT}$ 86 and a fixed Inverse Discrete Cosine Transform matrix $U_{coder}=U_{DCT}$ 80, where (as in the above examples) $U_{DCT} \cdot T_{DCT}$=Identity matrix I.

Specifically for DCT-based standard-compliant image and video coders, the pre-processing 68 and post-processing 78 transforms are represented by:

$$T_{pre}=U_{DCT} \cdot T, \text{ Pre-processing} \quad (3a)$$

$$U_{post}=U \cdot T_{DCT}, \text{ Post-processing} \quad (3b)$$

where the sizes of $T_{DCT}$ and $U_{DCT}$ are 8 by 8 and 8 by 8, respectively. This implies that the alternative forward transform T 60 and its inverse transform U 76 are of size 8 by N and N by 8, respectively.

Assuming that the Lapped Orthogonal Transform (LOT) is employed as the alternative transform T, then:

$$T_{pre}=U_{DCT} \cdot T_{LOT}, \text{ Pre-processing} \quad (4a)$$

$$U_{post}=U_{LOT} \cdot T_{DCT}, \text{ Post-processing} \quad (4b)$$

where $T_{LOT}$ and $U_{LOT}$ are of size 8 by 16 and 16 by 8, respectively.

The invention can be applied to all images in a video sequence or to a subset thereof. For a multidimensional signal the pre- and post-processing steps can be applied over all data rows and columns, over all dimensions, or over a subset of rows, columns, or dimensions. One embodiment of the invention in a standard-compliant MPEG (or H.26x) video coder applies the pre-processing and the post-processing steps on the intra frame of the video sequence. Another embodiment of the invention in the standard-compliant MPEG (or H.26x) video coder/encoder applies the pre-processing and the post-processing steps on all images in the video sequence and at any of the various processing stages of the video coder/encoder.

While this invention has been particularly shown and described with reference to preferred embodiments thereof, it will be understood by those skilled in the art that various changes in form and detail may be made therein without departing from the spirit and scope of the invention as defined by the appended claims.

We claim:

1. In a data compression system employing a fixed transform, a method for pre-processing input data comprising:
    modifying the input data by a cancellation transform which is the substantial inverse of the fixed transform to generate pre-processed data; and
    applying the pre-processed data to the fixed transform to generate compressed data; the compressed data being substantially unaffected by the fixed transform of the data compression system.

2. The method of claim 1 further comprising modifying the input data by an alternative transform.

3. The method of claim 2 wherein the alternative transform comprises a transform selected from the group consisting of: Lapped Orthogonal Transform, Generalized Lapped Orthogonal Transform, Wavelet Transform, Wavelet-Packed Transform, and artifact-reduction transform.

4. The method of claim 1 further comprising decompressing the compressed data by applying the compressed data to a decompression transform which is the substantial inverse of the fixed transform.

5. The method of claim 4 further comprising applying the decompressed data to the fixed transform, to generate output data which is substantially unaffected by the fixed transform.

6. The method of claim 5 further comprising post-processing the output data by applying the output data to a substantial inverse of the alternative transform to generate post-processed data.

7. The method of claim 1 wherein the fixed transform comprises a Discrete Cosine-based transform (DCT).

8. The method of claim 1 wherein the input data and output data comprise signals selected from the following set of signals: image data, video data, audio data, and multidimensional data.

9. The method of claim 8 wherein pre-processing is applied to all rows and columns of multidimensional data.

10. The method of claim 1 wherein the fixed transform is fixed in a standardized compression system selected from the following group of systems: JPEG, MPEG-I, MPEG-II, H.261, H.263, H.263+, and H.324.

11. The method of claim 1 wherein pre-processing is applied to all images of a video sequence, or a subset thereof.

12. The method of claim 1 wherein the data compression system is of a type selected from the group of system types comprising floating point, fixed point, and integer-valued.

13. The method of claim 1 further comprising intensity-scaling the pre-processed data to match the dynamic range of the data compression system.

14. A method for modifying source data with an alternative transform in a data compression system employing a fixed transform compliant with predetermined data compression standards comprising:
    modifying the source data with an alternative transform to generate input data;
    modifying the input data with a cancellation transform which is the substantial inverse of the fixed transform to generate pre-processed data; and
    applying the pre-processed data to the fixed transform to generate compressed data; the compressed data being substantially unaffected by the fixed transform.

15. The method of claim 14 further comprising decompressing the compressed data by applying the compressed data to a decompression transform which is the substantial inverse of the fixed transform.

16. The method of claim 15 further comprising applying the decompressed data to the fixed transform, to generate output data which is substantially unaffected by the fixed transform.

17. The method of claim 16 further comprising post-processing the output data by applying the output data to a substantial inverse of the alternative transform to generate post-processed data.

18. In a data compression system employing an inverse of a fixed transform, a method for post-processing compressed data comprising:
    applying the compressed data to the inverse of the fixed transform to generate decompressed data;
    applying the decompressed data to a cancellation transform which is substantially the inverse of the fixed transform to generate post-processed data; the post-processed data being substantially unaffected by the inverse of the fixed transform of the data compression system.

19. The method of claim 18 further comprising modifying the post-processed data by an inverse of an alternative transform to generate output data.

20. The method of claim 19 wherein the alternative transform comprises a transform selected from the group consisting of: Lapped Orthogonal Transform, Generalized Lapped Orthogonal Transform, Wavelet Transform, Wavelet-Packed Transform, and artifact-reduction transform.

21. The method of claim 18 further comprising pre-processing input data to generate the compressed data by:

modifying the input data by the inverse of the fixed transform to generate pre-processed data; and applying the pre-processed data to the cancellation transform to generate compressed data.

22. The method of claim 21 further comprising modifying the input data by the alternative transform.

23. The method of claim 18 wherein the fixed transform comprises a Discrete Cosine-based transform (DCT).

24. The method of claim 18 wherein the input data and output data comprise signals selected from the following set of signals: image data, video data, audio data, and multidimensional data.

25. The method of claim 24 wherein pre-processing is applied to all rows and columns of multidimensional data.

26. The method of claim 18 wherein the fixed transform is fixed in a standardized compression system selected from the following group of systems: JPEG, MPEG-I, MPEG-II, H.261, H.263, H.263+, and H.324.

27. A system for pre-processing input data by an alternative transform to generate compressed data in a data compression system employing a fixed transform comprising:

an alternative transform for modifying the input data to generate alternative data;

a first cancellation transform for modifying the alternative data by a first cancellation transform which is the substantial inverse of the fixed transform to generate pre-processed data; and a data compressor including a fixed transform for processing the pre-processed data to generate compressed data; the compressed data being substantially unaffected by the fixed transform of the data compression system.

28. The system of claim 27 wherein the alternative transform comprises a transform selected from the group consisting of: Lapped Orthogonal Transform, Generalized Lapped Orthogonal Transform, Wavelet Transform, Wavelet-Packed Transform, and artifact-reduction transform.

29. The system of claim 27 further comprising a decompression transform which is the substantial inverse of the fixed transform for decompressing the compressed data.

30. The system of claim 29 further comprising a second cancellation transform substantially comprising the fixed transform for processing the decompressed data to generate output data which is substantially unaffected by the fixed transform.

31. The system of claim 30 further comprising a post-processor for applying the output data to a substantial inverse of the alternative transform to generate post-processed data.

32. The system of claim 27 wherein the fixed transform comprises a Discrete Cosine-based transform (DCT).

33. A system for post-processing compressed data in a data decompression system employing an inverse of a fixed transform comprising:

a fixed data decompressor for applying the compressed data to the inverse of the fixed transform to generate decompressed data;

a first cancellation transform which is substantially the fixed transform to generate post-processed data; the post-processed data being substantially unaffected by the inverse of the fixed transform of the data compression system; and an inverse alternative transform for modifying the post-processed data by an inverse of an alternative transform to generate output data.

34. The system of claim 33 wherein the alternative transform comprises a transform selected from the group consisting of: Lapped Orthogonal Transform, Generalized Lapped Orthogonal Transform, Wavelet Transform, Wavelet-Packed Transform, and artifact-reduction transform.

35. The system of claim 33 further comprising a preprocessor for pre-processing input data by an alternative transform to generate compressed data in a data compression system employing a fixed transform comprising:

an alternative transform for modifying the input data to generate alternative data;

a second cancellation transform for modifying the alternative data by a second cancellation transform which is the substantial inverse of the fixed transform to generate pre-processed data; and a data compressor including a fixed transform for processing the pre-processed data to generate compressed data; the compressed data being substantially unaffected by the fixed transform of the data compression system.

36. The system of claim 33 wherein the fixed transform comprises a Discrete Cosine-based transform (DCT).

* * * * *